E. GREENWOOD.
TOOTHPICK MACHINE.
APPLICATION FILED SEPT. 24, 1915.
1,220,096.
Patented Mar. 20, 1917.
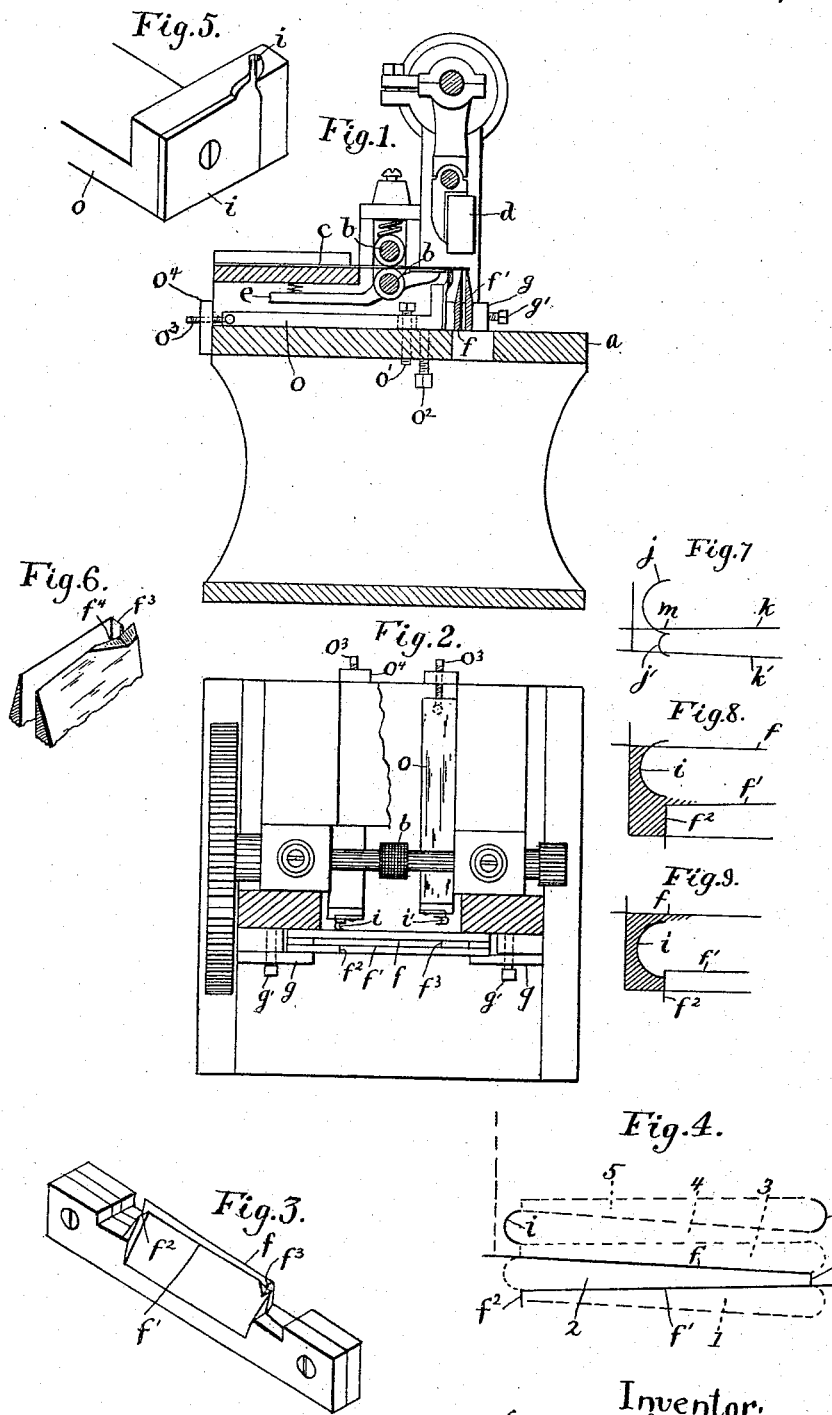

UNITED STATES PATENT OFFICE.

EDWARD GREENWOOD, OF PHILLIPS, MAINE.

TOOTHPICK-MACHINE.

1,220,096.  Specification of Letters Patent.  Patented Mar. 20, 1917.

Application filed September 24, 1915. Serial No. 52,520.

*To all whom it may concern:*

Be it known that I, EDWARD GREENWOOD, of Phillips, in the county of Franklin and State of Maine, have invented certain new and useful Improvements in Toothpick-Machines, of which the following is a specification.

My invention relates to machines for forming toothpicks from veneer strips wherein the strip of veneer is fed over slitting knives onto which it is forced by the vertical reciprocations of a rapidly moving cutting block. The particular type of machine to which my invention is directed is that in which the machines are designed to form the well known tapering toothpicks having the large end rounded or semicircular in outline, the small end being cut off square. These tapering toothpicks are formed by a pair of slitting knives positioned side by side with a tapering space between them the exact width of the toothpick. One reciprocation of the cutting block cuts off two toothpicks from the end of the veneer strip, one passing down between the knives and the other falling outside of the outer knife.

While the above described slitting knives have been common to all machines of this class, several different methods have been used for forming the rounded ends.

One form of cutting knife commonly used embodied the two slitting knives with lateral semicircular wings formed integral with the knives for forming the large ends of the toothpicks.

These knives were difficult to make and to keep sharpened and were liable to become dull and do imperfect work.

Another form made use of two straight slitting knives without end cutting wings, the end cutting knives being spaced away from the slitting knives and being entirely separated from them.

Such an arrangement is shown in patent to A. H. Hall, No. 963,141 dated July 5, 1910. In this case the end cutting knives had a small semicircular knife for the small end of the toothpick and a larger semicircular knife for the large end, the two knives being formed integral.

The difficulty with this arrangement was that if it was not spaced away from the slitting knives with great exactitude a small sliver was liable to be cut from the large semicircle which would adhere to the small end of the adjacent toothpick, as more fully explained hereinafter.

According to my invention I make the semicircular cut for the large end of the toothpick before the straight knives are reached but I form on each of the straight knives a lateral wing for forming the small end so that even if the end cuts do not register exactly with the slitting knives no sliver can adhere to the small end of the toothpick as will be fully explained hereinafter.

The straight lateral wing formed on the end of each knife is easy to make and easy to keep in repair.

My invention may best be understood by reference to the accompanying drawing in which is shown the principal parts of a standard toothpick machine of the type above mentioned with my cutting knives attached.

In the drawing—

Figure 1 is a central vertical section through the machine from front to rear,

Fig. 2 is a plan with the upper portion cut away and certain parts omitted,

Fig. 3 is a perspective view of the slitting knives,

Fig. 4 is a diagram showing the arrangement of slitting and end forming knives with relation to the veneer strips, Fig. 5 is a perspective view of the curved end forming knives, Fig. 6 is a detail of one end of the double slitting knives showing how they come together, Fig. 7 is a diagram showing the result of failure to register in the construction of which the Hall patent is an illustration and Figs. 8 and 9 are like diagrams showing the results in my arrangement of a failure to register.

In the drawing like letters of reference indicate like parts.

Referring to the drawing, $a$ represents the bed of the machine, $b$ $b$ are the feed rolls, $c$ is the veneer strip, $d$ the vertically reciprocating cutting block and $e$ is the lifting plate.

The slitting knives $f$ and $f'$ are secured in place on the bed of the machine in the usual manner by clamps $g$ held in place by screws $g'$.

The knives $f$ and $f'$ are formed with straight slitting edges for separating the toothpicks from the end of the veneer strip and they are held together in the usual manner by screws. They are separated by a tapering space the exact width of a toothpick. One end of each knife has a lateral cutting wing formed on it for cutting off the smaller end of the toothpick, the opposite straight end being long enough to extend beyond the edge of the veneer strip.

As herein shown, the outer knife $f'$ has a wing $f^2$ extending from one end substantially at right angles to the straight portion of the knife and in a direction away from the knife $f$.

The knife $f$ has a lateral wing $f^3$ which extends into contact with the inner surface of the knife $f'$ forming the termination of the intervening space. To avoid the formation of splinters tending to clog the corner where the wing $f^3$ and the knife $f'$ come together, I cut away the edge of the knife $f'$ at $f^4$ so that the wing acts first in cutting off the end of the toothpick and then the slitting portion of the knife comes into action and completes the formation of the toothpick. The formation of a splinter in the corner is thus avoided and any tendency to clog is overcome.

The rounded end of the toothpick is formed by a pair of curved knives $i$ and $i'$, one on each side and placed adjacent to the edge of the veneer strip. Each of the knives $i$ and $i'$ is spaced away from the corresponding end cutting wing at least one double space, that is, the distance the veneer strip moves in one stroke or the width of two toothpicks. The knife $i$ is spaced one space from the wing $f^2$ on the line of feed and the knife $i'$ is spaced two double spaces from the wing $f^3$. It is necessary to space the knives $i$ and $i'$ far enough away from the main knife so that the knives will not touch but with this qualification they should be placed as near together as possible. The relative positions of the slitting and the auxiliary curved knives are clearly shown in Fig. 4 where the full lines show the cutting edges of the several knives and the dotted lines show the outlines of the toothpicks already cut and to be cut.

Referring to Fig. 4 1, 2, 3, 4 and 5 indicate five toothpicks as they are cut or will be cut from the veneer strip. Assuming that the cutting block has come down onto the knives, the toothpick 1 will be severed from the end of the veneer strip outside of the outer knife $f'$ and the toothpick 2 will pass down between the knives $f$ and $f'$. In each case the rounded end of 2 will have been cut by the knife $i$ on the last stroke and the end of 1 will have been cut on the last stroke but one by the knife $i'$. In both cases the small end is cut off by the wing knives $f^2$ and $f^3$ on the final stroke.

In Figs. 7, 8 and 9 I have shown diagrams illustrating the effect of failure to register in the arrangement as shown in the Hall patent above referred to and when arranged according to my present invention.

Referring to Fig. 7, $j$ and $j'$ are the two end cuts made on the stroke before the toothpicks are severed by the straight slitting knives $k$ and $k'$. If there is a failure to register, the pointed sliver $m$ will be left on the small end of the toothpick and will be a very plainly seen and objectionable defect in the article.

In Fig. 8 I illustrate a failure to register in one direction in my machine and in Fig. 9 I illustrate a failure to register in the opposite direction. In either case the shaded portion will come away carrying with it a portion split from the side of the toothpick which while it will make the toothpick a little narrower will not be noticeable or particularly objectionable like the projecting splinter $m$ in the other case.

It will be seen that in any event whether the points register or not my arrangement of knives will produce toothpicks that are smooth and free from splinters.

The curved end forming knives $i$ and $i'$ are secured to the upturned ends of the knife bars $o$, these bars resting on the bed of the machine. Each of the bars is held down by a screw $o'$ and a vertical adjusting screw $o^2$ enables it to be raised and lowered.

The knife is adjusted longitudinally of the bar by adjusting screws $o^3$ engaging fixed standards $o^4$ attached to the bed of the machine.

I claim;

1. In a toothpick machine of the character described, the combination of means for feeding a veneer strip, a pair of straight slitting knives one end of each knife extending beyond the edge of the veneer strip, said knives being separated by a tapering space the width of a toothpick, each of said knives having at one end a lateral wing for cutting the small end of the toothpick, one of said wings terminating one end of said tapering space, a curved knife for forming the large end of the toothpick adjacent to each edge of the veneer strip, said curved knives being spaced away from said wings on the line of feed one or more double spaces.

2. In a toothpick machine of the character described, the combination of a pair of slitting knives separated by a tapering space the width of a toothpick, one of said knives having a wing terminating said tapering space and impinging on the inner side of the other knife, the cutting edge of the last mentioned knife being depressed below the cutting edge of said wing at the point of junction.

3. In a toothpick machine of the character described, the combination of a pair of slitting knives and an auxiliary end cutting knife spaced ahead of said slitting knives, a knife bar to the end of which said end cutting knife is secured, said knife bar extending to the front of the machine and an adjusting screw at the front of the machine for adjusting the knife bar longitudinally.

In testimony whereof I have affixed my signature.

EDWARD GREENWOOD.

Witnesses:
JAMES MORRISON,
CHARLES F. CHANDLER.

Copies of this patent may be obtained for five cents each, by addressing the "Commissioner of Patents, Washington, D. C."